W. LONGEWAY.
TIRE ARMOR.
APPLICATION FILED MAY 17, 1917.

1,291,951.

Patented Jan. 21, 1919.
2 SHEETS—SHEET 1.

INVENTOR
W. Longeway.
BY
Fred G. Dieterich & Co.
ATTORNEYS

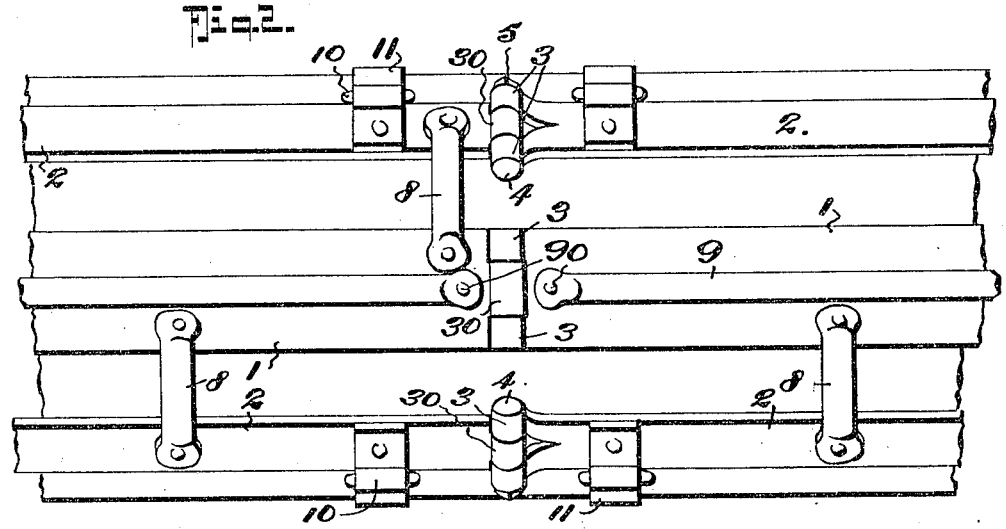
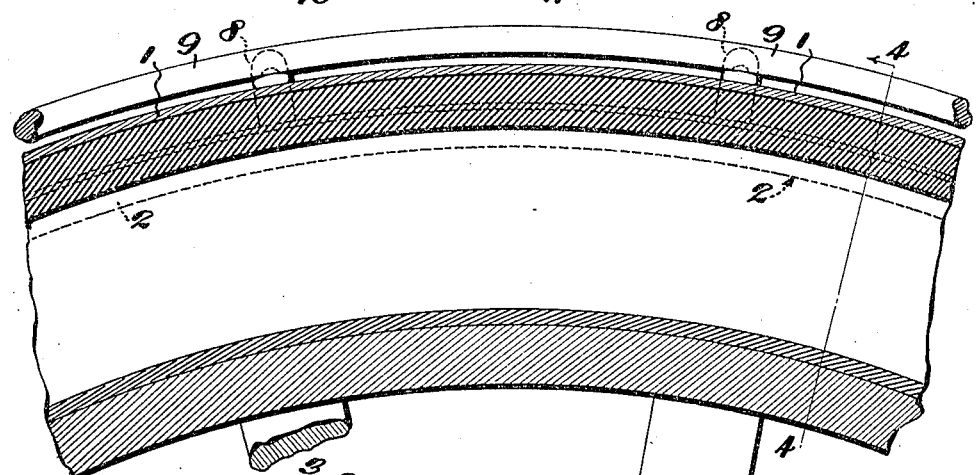
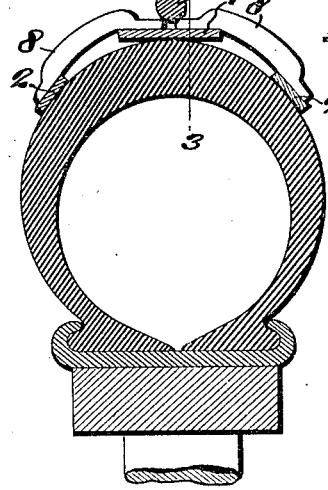
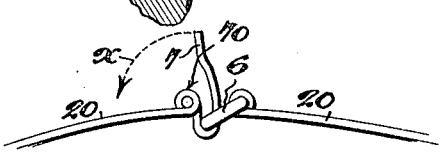

UNITED STATES PATENT OFFICE.

WILLIAM LONGEWAY, OF GARY, INDIANA.

TIRE-ARMOR.

1,291,951. Specification of Letters Patent. Patented Jan. 21, 1919.

Application filed May 17, 1917. Serial No. 169,282.

*To all whom it may concern:*

Be it known that I, WILLIAM LONGEWAY, a citizen of the United States, residing at Gary, in the county of Lake and State of Indiana, have invented a new and Improved Tire-Armor, of which the following is a specification.

My invention, which has reference to that type of armors or protecting shields formed of metallic sections adapted for being connected for forming a complete band or armor, primarily has for its purpose to provide an improved construction of tire armor of the general character stated in which the plurality of sections are individually of such shape, whereby, when they are operatively assembled upon the tire, they provide a simple, strong and durable shield particularly well adapted for being applied to pneumatic tires of automobiles, which while effectively protecting the tire against injury, also increases its traction adherence to the road, so as to safely travel over ice, snow and mud, or climbing hills and which acts as an anti-skid device for preventing accidents due to wet or slippy streets, by reason of the front vehicle wheel failing to properly respond to the guiding tendency of the steering gear and which is particularly adapted, when properly applied to the tire for preventing accidents while turning curves at high speeds.

Another and improved object of my invention is to provide a guard or protector for pneumatic tires in which the coöperative parts are so designed that they may be readily applied to and removed from the tire, which, while affording ample protection for the tire, is of the desired flexibility and in which the parts are so constructed as to afford an efficient drive between the protector and the tire.

My invention consists in the peculiar combination and novel arrangement of the parts that will be first described in detail, then specifically pointed out in the appended claim and illustrated in the accompanying drawings, in which:

Fig. 2 is a plan view of a portion of the wheel with several sections of my armor or protecting shield secured thereon.

Fig. 3 is a longitudinal section of a fragment of the wheel and the protecting armor, taken on the line 3—3 on Fig. 4.

Fig. 4 is a cross section thereof on the line 4—4 on Fig. 3.

Fig. 6 is a detail view of the engaging ends of a set of single bands.

Figure 1:
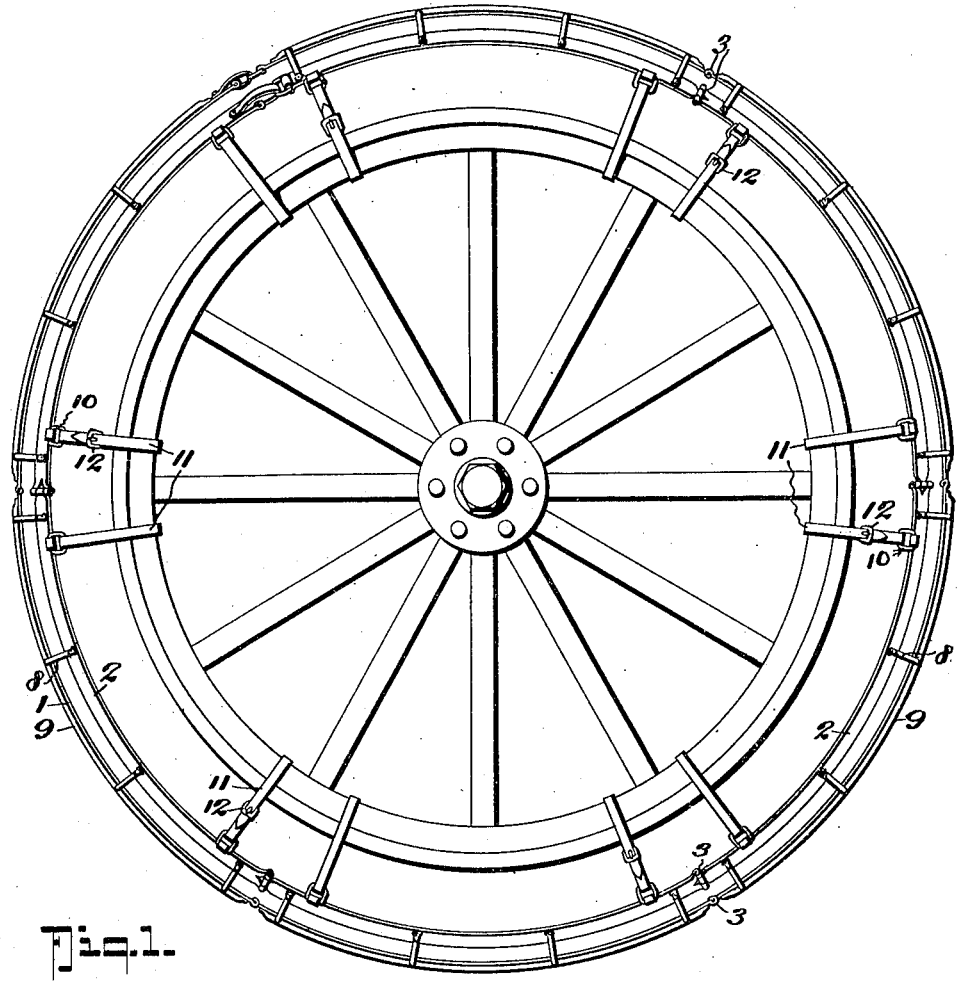
Figure 1 is a side elevation of a motor vehicle wheel with my improved armor operatively applied thereto.

In carrying out my invention, I form the armor of a series of anti-skid units, all of like individual construction and they are joined in such manner that, when all of the said units of the complete armor are connected, in the manner presently explained, they form a complete annular shield or armor adapted for closely fitting over the tread face of the wheel tire, as is clearly shown in Fig. 1.

In the drawings, I have shown the armor in the nature of a shield or rim composed of six sections but I wish it understood that the said armor or shield may be made up of more or less sections depending largely on the character and size of the wheel to which the armor is to be applied.

Each armor section consists of three parallelly disposed segmental bands, a central one 1 preferably 1½ inches wide, and two outer ones 2—2 each 1 inch wide and all of the said bands are preferably of spring steel ⅛ of an inch.

Figure 5:
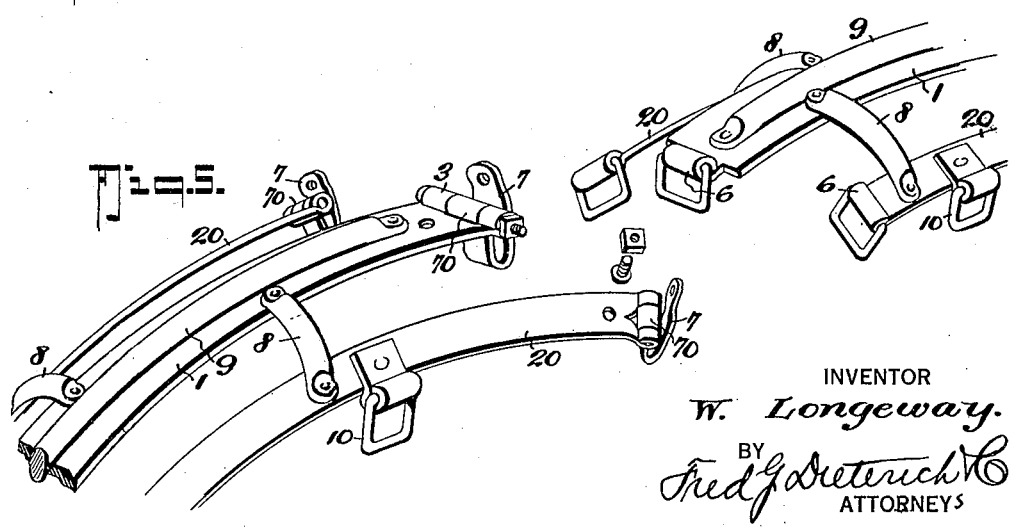
Fig. 5 is a perspective view of the meeting end of two sections of the armor.

All of the outer bands 2, excepting the two designated 20—20 in Fig. 5, have one of their ends formed with bifurcated extensions which are bent to produce two hinged eyes 3—3 and the other end formed with a central extension bent into a single eye 30, the single eye 30 on one end being adapted for fitting closely up between a pair of eyes 3—3 on the corresponding end of the adjacent section 20, to thereby provide for the easy application of screw pintles 4—4 that fit the sets of eyes 3 and 30—30 to form the hinge,—nuts 5 being applied to the pintles to secure them in place, as shown.

The interengaging ends of the two opposing bands 20—20 are shaped up, as is best shown in Fig. 5, by reference to which it will be observed that the ends of the three bands having the single eye members 30—30 are formed with loops 6 adapted for being engaged by spring metal coupling members 7 bent into a hook shape and each having an eye 70 for fitting between the pair of hinged eyes 3—3 on the adjacent end of the other section 20, as shown.

After the series of sections that constitute the complete shield or armor are fitted over a tire, the coupling hooks 7 on one section 20 are passed through the loop 6 on the adjacent end of the adjacent section 20 and then swung back, as indicated by the broken line $x$ on Fig. 6, to the position shown in full lines on Fig. 1 and, when thus thrown back, the two adjacent ends of the shield band or armor are pulled tightly onto the tread face of the tire and held to the latter adjustment by the nut and bolt lock devices that engage the said members 6 and the band with which they connect, as is clearly shown in the drawing.

The central and side bands 1 and 2—2 are joined to form, as it were, a rigid armor section by a series of slightly arched shape cross bars 8—8 riveted at one end to a side band and likewise fastened at the other end to the central band 1.

Each armor section also includes a reinforce composed of a stout steel rod 9 that extends lengthwise and midway of the outer or tread face of the central band 1 and it has its ends riveted to the said band 1, as indicated at 90—90 and in fitting the said rod 9 over the said central band 1, it is drawn up so that from its ends to the center it tends to normally set off from the band.

By attaching the rod 9 to the central band 1, as stated, the said rod takes up the longitudinal strain on the band and at the same time presents a longitudinally extended tread member of such resiliency that will, to a certain extent, take up road shocks and overcome undue strains or shocks on the central band and, at the same time, also present a drag which aids in preventing side skidding of the wheel.

The arched shape cross bars 8—8 take up the lateral strains to which the several bands 1 and 2—2 are subjected and also serve to increase the tractive adherence to the road and to act as anti-skidding elements for holding the wheel from straight ahead skidding on an equal application of the brake mechanism.

Any suitable means may be provided for individually attaching each of the armor sections onto the tire, for example, by providing each section with laterally projected pivoted loops 10—10 and connecting strap ends 11—11 thereto, and buckle connections 12 for joining the said strap ends around the wheel rim or felly, as shown.

What I claim is:

An armor for vehicle tires comprising a plurality of similarly constructed sections, said sections being flexibly joined at their ends with each other and adapted to extend from and around the tire tread, each of the said sections comprising a central band and two side bands, means for holding the several bands in rigid relation, the said means consisting of a plurality of arched spring metal cross members secured at their outer ends to the side bands and at their inner ends to the central band and a longitudinal reinforce on the tread face of the central band, the said reinforce consisting of a spring rod secured at the opposite ends thereof to the central band and bowed outwardly between its ends, the said reinforce and the arched cross members forming anti-skid and traction elements.

WILLIAM LONGEWAY.

Copies of this patent may be obtained for five cents each, by addressing the "Commissioner of Patents, Washington, D. C."